(12) United States Patent
Wang et al.

(10) Patent No.: US 8,401,894 B2
(45) Date of Patent: Mar. 19, 2013

(54) ONLINE INCENTIVE MANAGEMENT

(75) Inventors: Elliot Lee Wang, Sunnyvale, CA (US);
Mohan K. Sabapathi Kumaresh, Fremont, CA (US)

(73) Assignee: Ebay Inc., San Jose, CA (US)

( * ) Notice: Subject to any disclaimer, the term of this patent is extended or adjusted under 35 U.S.C. 154(b) by 516 days.

(21) Appl. No.: 12/114,242

(22) Filed: May 2, 2008

(65) Prior Publication Data
US 2009/0276308 A1   Nov. 5, 2009

(51) Int. Cl.
*G06Q 40/00* (2012.01)
(52) U.S. Cl. .......... 705/14; 705/15; 705/16; 705/40
(58) Field of Classification Search .......... 705/14
See application file for complete search history.

(56) References Cited

U.S. PATENT DOCUMENTS

| | | | | |
|---|---|---|---|---|
| 2002/0062249 | A1* | 5/2002 | Iannacci | 705/14 |
| 2006/0080236 | A1* | 4/2006 | Welker et al. | 705/40 |
| 2007/0288312 | A1* | 12/2007 | Wang | 705/14 |

FOREIGN PATENT DOCUMENTS

EP             949596 A2 *   10/1999

* cited by examiner

*Primary Examiner* — Hai Tran
(74) *Attorney, Agent, or Firm* — Haynes and Boone, LLP

(57) ABSTRACT

Various methods and systems are provided to facilitate the centralized storage and access of online incentives such as coupons redeemable at associated online marketplaces. In one example, merchants may provide incentive information to payment service providers that in turn may associate such information with user accounts maintained by the payment service providers. Payment service providers may permit users to view incentives associated with their user accounts, thereby providing users with a comprehensive way to manage incentives from a plurality of online merchants. In another example, merchants may advise users of previously registered incentives in response to user activities in relation to online marketplaces.

25 Claims, 6 Drawing Sheets

600

| INCENTIVE | TYPE | ORIGINAL VALUE | BALANCE | STATUS | VALIDITY |
|---|---|---|---|---|---|
| PGCXXXX0456 | GIFT CARD | $50.00 | $50.00 | ACTIVE | ON ANY PURCHASE FROM MULTIPLE MERCHANT MARKETPLACE ABC |
| RWxxxx6780 | REWARD VOUCHER | $25.00 | $25.00 | EXPIRES 05/30/08 | ON ANY PURCHASE FROM MULTIPLE MERCHANT MARKETPLACE ABC |
| Cxxxx3435 | COUPON | 15% OFF | N/A | EXPIRES 04/03/07 | ON PURCHASE OF ANY ITEM FROM DEF INC. |
| MGCxxxx2316 | GIFT CARD | $100.00 | $34.00 | ACTIVE | ON PURCHASE OF ANY ITEM FROM GHI CORP. |
| Cxxxx8754 | COUPON | $7.00 | $7.00 | EXPIRES 04/26/07 | ON PURCHASE OF ANY ITEM FROM JKL INC. |
| GCxxxx3465 | GIFT CERTIFICATE | $150.00 | $56.00 | ACTIVE | ON ANY PURCHASE FROM MULTIPLE MERCHANT MARKETPLACE ABC |

| INCENTIVE | TYPE | BALANCE |
|---|---|---|
| PGCXXXX | GIFT CARD | $50.00 |
| Cxxx | COUPON | N/A |
| MGCxxxx | GIFT CARD | $34.00 |

| SEARCH RESULT FOR "MP3 PLAYER" | | |
|---|---|---|
| MERCHANT | PRICE | INCENTIVE |
| DEF INC. | $100.00 | 10% OFF |
| GHI CORP. | $99.90 | NONE |
| JKL CORP. | $120.00 | FREE SHIPPING |

ONLINE INCENTIVE MANAGEMENT

BACKGROUND

1. Field of the Invention

The present invention generally relates to online transactions and more particularly to the management of incentive information to facilitate online transactions.

2. Related Art

Customers routinely search for and purchase products and services through electronic communications with online merchants over electronic networks such as the Internet. During the course of these transactions, customers may provide payment in various ways including, for example, credit cards, electronic fund transfers, and other payment techniques offered by service providers.

In order to attract customers, online merchants may provide incentives in the form of discounts, sales, or other offers directed to various products and services. However, it is often difficult to inform relevant consumers of such incentives. For example, merchants are often required to engage in expensive advertising directed to various media in order to attract consumers to appropriate merchant websites. Other forms of advertising, such as unsolicited email messages, may be ignored or not trusted by consumers.

Also, it is often difficult for consumers to remember or manage incentives in any organized fashion. In this regard, consumers may occasionally print out or electronically store merchant incentive offers for future reference. But such an approach requires continuous management by consumers which can be unduly burdensome. Moreover, consumers who chose not to perform such management may be unable to recall previously offered merchant incentives which may result in lost sales for merchants and lost savings opportunities for consumers.

SUMMARY

In accordance with an embodiment of the invention, a method of managing incentives for online transactions includes maintaining a plurality of user accounts comprising user financial information. The method also includes receiving incentive information over a network. The incentive information identifies incentives associated with a plurality of online marketplaces. The method further includes storing the incentive information in a plurality of incentive records. In addition, the method includes associating each of the incentive records with at least one of the user accounts. The method also includes serving the incentive information of at least one of the incentive records associated with the one of the user accounts over the network.

In accordance with another embodiment of the invention, a method of providing incentives for online transactions includes generating incentive information identifying an incentive associated with an online marketplace. The method also includes passing the incentive information to a payment service provider over a network. The method further includes providing a client device with access to the online marketplace over the network. In addition, the method includes detecting a user identifier stored by the client device. The method also includes passing the user identifier to the payment service provider. The method further includes receiving the incentive information from the payment service provider in response to the user identifier. In addition, the method includes serving the incentive information to the client device over the network.

In accordance with another embodiment of the invention, a method of managing incentives for online transactions includes providing incentive information from a client device over a network to a payment service provider server to store the incentive information in an incentive record associated with a user account. The user account comprises financial information associated with a user of the client device. The incentive information identifies an incentive associated with an online marketplace.

In accordance with another embodiment of the invention, a payment service provider system includes means for maintaining user financial information. The payment service provider system also includes means for receiving incentive information over a network. The incentive information identifies incentives associated with a plurality of online marketplaces. The payment service provider system further includes means for storing the incentive information. In addition, the payment service provider system includes means for associating the incentive information with the user financial information. The payment service provider system also includes means for serving the incentive information over the network.

In accordance with another embodiment of the invention, an online marketplace system includes means for generating incentive information identifying an incentive associated with the online marketplace. The online marketplace system also includes means for passing the incentive information to a payment service provider over a network. The online marketplace system further includes means for providing a client device with access to the online marketplace over the network. In addition, the online marketplace system includes means for detecting a user identifier stored by the client device. The online marketplace system also includes means for passing the user identifier to the payment service provider. The online marketplace system further includes means for receiving the incentive information from the payment service provider in response to the user identifier. In addition, the online marketplace system includes means for serving the incentive information to the client device over the network.

In accordance with another embodiment of the invention a client device includes means for providing incentive information from the client device over a network to a payment service provider server to store the incentive information in an incentive record associated with a user account. The user account comprises financial information associated with a user of the client device. The incentive information identifies an incentive associated with an online marketplace.

These and other features and advantages of the present invention will be more readily apparent from the detailed description of the embodiments set forth below taken in conjunction with the accompanying drawings.

BRIEF DESCRIPTION OF THE FIGURES

FIGS. 6-7 illustrate sample user interfaces displayed during the process of FIG. 4 in accordance with an embodiment of the invention.

FIG. 8 illustrates a sample user interface displayed during the process of FIG. 5 in accordance with an embodiment of the invention.

Like element numbers in different figures represent the same or similar elements.

DETAILED DESCRIPTION

In accordance with various embodiments disclosed herein, incentives such as coupons, gift certificates, credit balances, vouchers, or other forms of discounts offered by online merchants can be provided to payment service providers and associated with user accounts maintained by such payment service providers. For example, in one embodiment, merchants may provide incentive information (e.g., identifying one or more incentives offered by one or more merchants) to payment service providers that in turn may associate such information with user accounts maintained by the payment service providers. Payment service providers may permit users to view incentive information associated with their user accounts, thereby providing users with a comprehensive way to manage incentives from a plurality of online merchants.

Merchants may also remind users of previously registered incentive information in response to user activities in relation to online marketplaces. For example, in one embodiment, a merchant may detect the existence of a user's account with a payment service provider and receive previously registered incentive information from the payment service provider to serve such information to an appropriate client device operated by the user.

Figure 1:
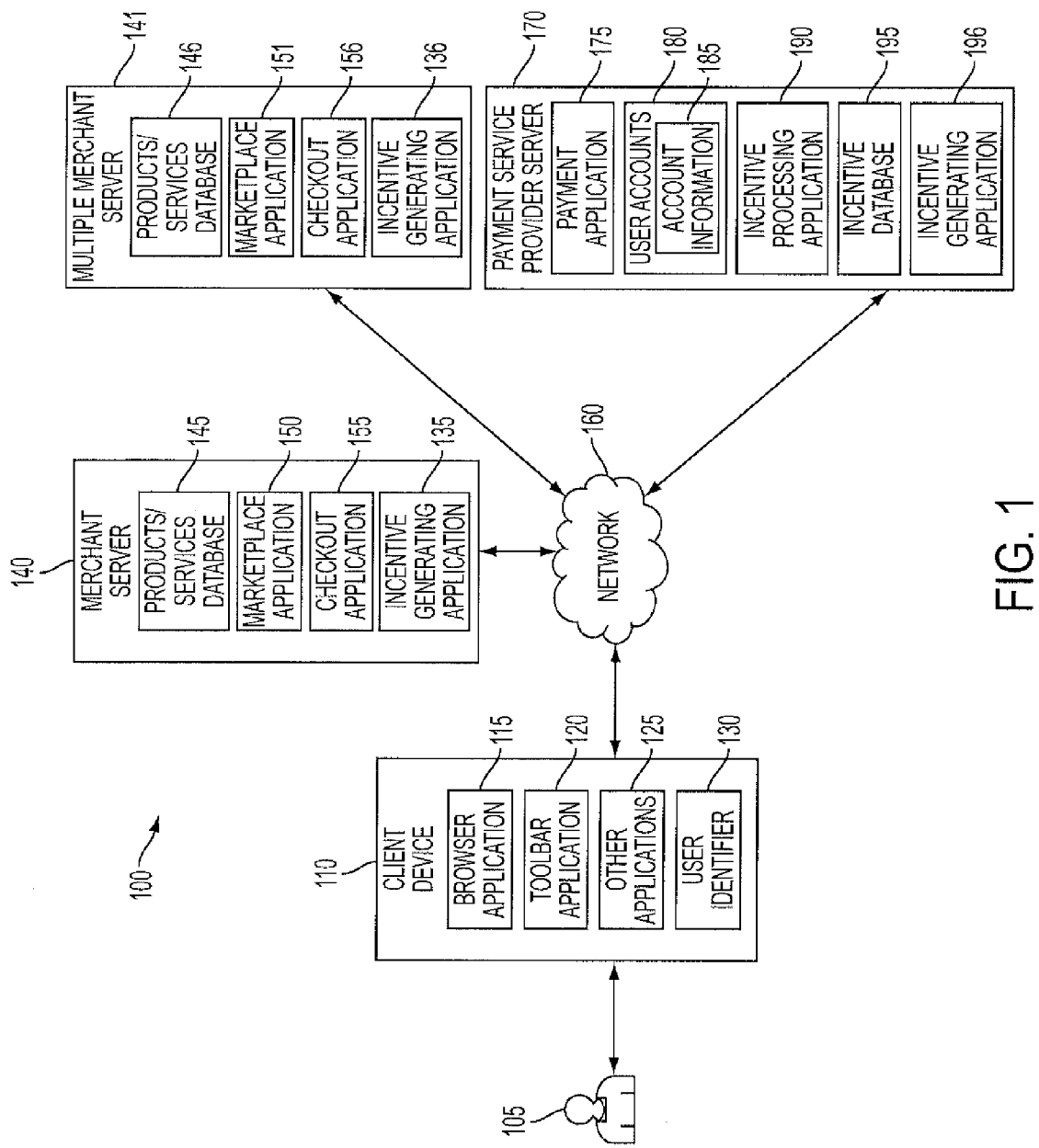
FIG. 1 illustrates a block diagram of a networked system configured to manage online incentives in accordance with an embodiment of the invention.

Referring now to the drawings wherein the showings are for purposes of illustrating embodiments of the present invention only, and not for purposes of limiting the same, FIG. 1 illustrates a block diagram of a networked system 100 configured to manage online incentives in accordance with an embodiment of the invention. As shown, system 100 includes a client device 110, a merchant server 140, a multiple merchant server 141, and a payment service provider server 170 in communication over a network 160.

Client device 110, merchant server 140, multiple merchant server 141, and payment service provider server 170 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of system 100, and/or accessible over network 160.

Network 160 may be implemented as a single network or a combination of multiple networks. For example, in various embodiments, network 160 may include the Internet or one or more intranets, landline networks, wireless networks, and/or other appropriate types of networks.

Client device 110 may be implemented using any appropriate combination of hardware and/or software configured for wired and/or wireless communication over network 160. For example, in one embodiment, client device 110 may be implemented as a personal computer of a user 105 (e.g., a customer) in communication with the Internet. In other embodiments, client device 110 may be implemented as a wireless telephone, personal digital assistant (PDA), notebook computer, and/or other types of computing devices.

As shown, client device 110 may include one or more browser applications 115 which may be used, for example, to provide a convenient interface to permit user 105 to browse information available over network 160. For example, in one embodiment, browser application 115 may be implemented as a web browser configured to view information available over the Internet.

Client device 110 may also include one or more toolbar applications 120 which may be used, for example, to provide client-side processing for performing desired tasks in response to operations selected by user 105. In one embodiment, toolbar application 120 may display a user interface in connection with browser application 115 as further described herein.

Client device 110 may further include other applications 125 as may be desired in particular embodiments to provide desired features to client device 110. For example, in various embodiments, such other applications 125 may include security applications for implementing client-side security features, programmatic client applications for interfacing with appropriate application programming interfaces (APIs) over network 160, or other types of applications.

As also shown in FIG. 1, client device 110 includes one or more user identifiers 130 which may be implemented, for example, as operating system registry entries, cookies associated with browser application 115, identifiers associated with hardware of client device 110, or other appropriate identifiers. In one embodiment, user identifier 130 may be used by a payment service provider to associate user 105 with a particular account maintained by the payment service provider as further described herein.

Merchant server 140 may be maintained, for example, by an online merchant offering various products and/or services in exchange for payment to be received over network 160. In this regard, merchant server 140 includes a database 145 identifying available products and/or services (e.g., collectively referred to as items) which may be made available for viewing and purchase by user 105. Accordingly, merchant server 140 also includes a marketplace application 150 which may be configured to serve information over network 160 to browser 115 of client 110. For example, in one embodiment, user 105 may interact with marketplace application 150 through browser application 115 over network 160 in order to search and view various products or services identified in database 145.

Merchant server 140 also includes a checkout application 155 which may be configured to facilitate the purchase by user 105 of goods or services identified by marketplace application 150. In this regard, checkout application 155 may be configured to accept payment information from user 105 and/or from payment service provider server 170 over network 160.

Merchant server 140 further includes an incentive generating application 135 which may be configured to generate various incentives such as incentives which may be redeemed by user 105 during interactions with merchant server 140. For example, in one embodiment, incentive generating application 135 may be configured to generate and distribute incentive information to payment service provider server 170 for association with various user accounts maintained by payment service provider server 170.

Multiple merchant server 141 may be maintained, for example, by an online service provider that displays various products and/or services available from a plurality of merchants (for example, from one or more of merchants maintaining corresponding merchant servers 140). In one embodiment, multiple merchant server 141 may be provided by eBay Inc.

Multiple merchant server 141 includes a database 146 identifying available products and/or services (e.g., collectively referred to as items) which may be made available for viewing and purchase by user 105. Accordingly, multiple merchant server 141 also includes a marketplace application 151 which may be configured to serve information over network 160 to browser 115 of client 110. For example, in one embodiment, user 105 may interact with marketplace application 151 through browser application 115 over network 160 in order to search and view various products or services identified in database 146.

Multiple merchant server 141 also includes a checkout application 156 which may be configured to facilitate the purchase by user 105 of goods or services identified by marketplace application 151. In this regard, checkout application 156 may be configured to accept payment information from user 105 and/or from payment service provider server 170 over network 160.

Multiple merchant server 141 further includes an incentive generating application 136 which may be configured to generate various incentives such as incentives which may be redeemed by user 105 during interactions with multiple merchant server 141. For example, in one embodiment, incentive generating application 136 may be configured to generate and distribute incentive information to payment service provider server 170 for association with various user accounts maintained by payment service provider server 170.

Payment service provider server 170 may be maintained, for example, by an online payment service provider which may provide payment on behalf of user 105 to the operator of merchant server 140 or multiple merchant server 141. In this regard, payment service provider server 170 includes one or more payment applications 175 which may be configured to interact with client device 110, merchant server 140, and/or multiple merchant server 141 over network 160 to facilitate the purchase of goods or services by user 105 from merchant server 140 and/or multiple merchant server 141. In one embodiment, payment service provider server 170 may be provided by PayPal, Inc.

Payment service provider server 170 also maintains a plurality of user accounts 180, each of which may include account information 185 associated with individual users. For example, in one embodiment, account information 185 may include private financial information of user 105 such as account numbers, passwords, credit card information, bank information, or other financial information which may be used to facilitate online transactions by user 105. Advantageously, payment application 175 may be configured to interact with merchant server 140 and/or multiple merchant server 141 on behalf of user 105 during a transaction with checkout applications 155 or 156 without requiring user 105 to provide account information 185 to merchant server 140 or multiple merchant server 141.

Payment service provider server 170 also provides an incentive processing application 190 which may be configured to receive incentive information from merchant server 140 and/or multiple merchant server 141 for storage in an incentive database 195. Incentive processing application 190 may be further configured to select incentive records from incentive database 195 to be provided to user 105.

Payment service provider server 170 further includes an incentive generating application 196 which may be configured to generate various incentives such as incentives which may be redeemed by user 105 during interactions with merchant server 140 and/or multiple merchant server 141. For example, in one embodiment, incentive generating application 196 may be configured to generate and distribute incentive information to payment service provider server 170 for association with various user accounts maintained by payment service provider server 170.

FIGS. 2-7 illustrate processes which may be performed by system 100 in accordance with various embodiments of the invention. In such embodiments, it is assumed that user 105 has previously registered with payment service provider server 170 to open a user account 180. In this regard, it will be appreciated that user 105 may have previously provided account information 185 to payment service provider server 170 over network 160 through, for example, a secure connection between client device 110 and payment service provider server 170.

As a result of such previous registration, client device 110 stores a user identifier 130 that may be used to identify the particular user 105 as having a user account 180 maintained by payment service provider server 170. As previously described, user identifier 130 may be implemented, for example, as one or more cookies, operating system registry entries, hardware identifiers, or other types of identifiers.

Figure 2:
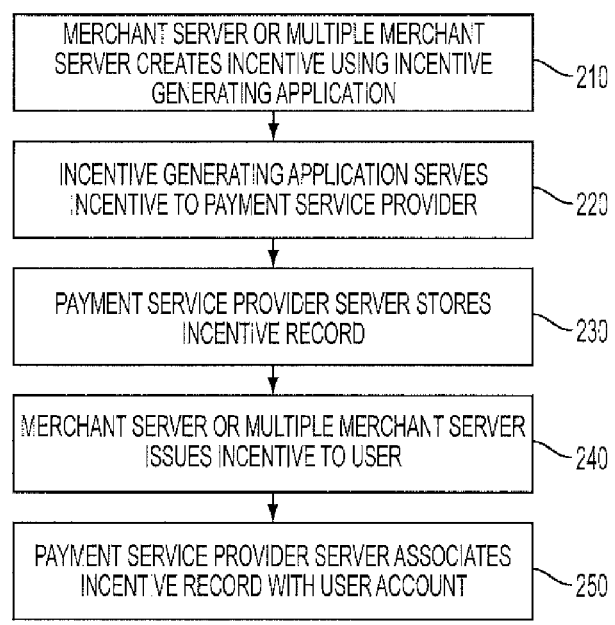
FIG. 2 illustrates a process of storing online incentives in response to a merchant server or a multiple merchant server in accordance with an embodiment of the invention.

FIG. 2 illustrates a process of storing online incentives in response to merchant server 140 or multiple merchant server 141 in accordance with an embodiment of the invention. In step 210, a merchant associated with merchant server 140 or multiple merchant server 141 generates an incentive. In this regard, the merchant may inform one or more of incentive generating applications 135, 136, and/or 196 of an incentive to be offered to one or more customers (e.g., such as user 105). In response, incentive generating application 135, 136, and/or 196 generates incentive information corresponding to the incentive identified by the merchant. In one embodiment, step 210 may include the creation of an online incentive campaign directed to particular user accounts 180 maintained by payment service provider 170. In another embodiment, step 210 may include the creation of an incentive program indiscriminately offered to all user accounts 180 of payment service provider 170.

In step 220, incentive generating application 135, 136, and/or 196 serves (i.e., passes) the incentive information generated in step 210 to payment service provider server 170 over network 160. In response, payment service provider server 170 stores the incentive information as an incentive record in incentive database 195 (step 230).

In step 240, the merchant chooses to issue the incentive to a particular user, such as user 105. Accordingly, merchant server 140 and/or multiple merchant server 141 may also pass such information to payment service provider server 170 in step 240.

In step 250, incentive processing application 190 associates the newly stored incentive record with one or more individual user accounts 180 in response to the information passed in step 240. Incentive processing application 190 may be implemented with appropriate rules-based or heuristics-based facilities for associating appropriate incentive records with particular user accounts 180 by comparing the new incentive information with user identifier 130, user account 180, account information 185, information received from merchant server 140, or other characteristics. Alternatively, incentive processing application 190 may be configured to indiscriminately associate the new incentive record with all of user accounts 180.

Figure 3:
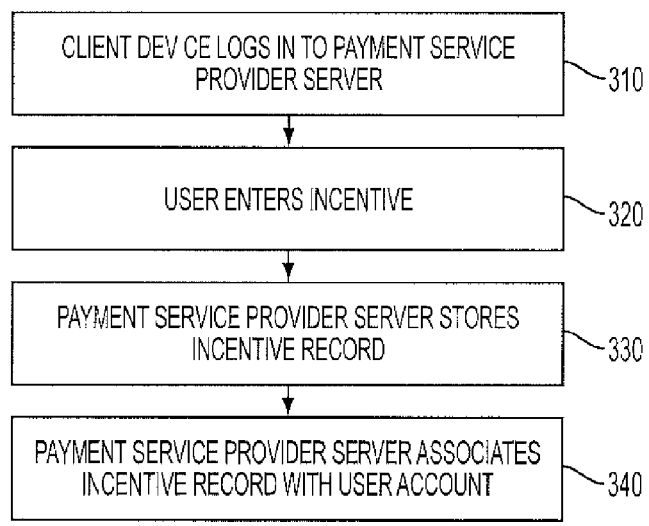
FIG. 3 illustrates a process of storing online incentives in response to a client device in accordance with an embodiment of the invention.

FIG. 3 illustrates a process of storing online incentives in response to client device 110 in accordance with an embodiment of the invention. In step 310, client device 110 logs in to payment service provider server 170 through, for example, browser application 115, toolbar application 120, or other applications 125 of client device 110. In this regard, user 105 may be authenticated to access an appropriate one of user accounts 180 associated with user 105. For example, in one embodiment, client device 110 may pass user identifier 130 to payment service provider server 170 during step 310.

In step 320, user 105 provides incentive information to payment service provider server 170. Such incentive information may correspond to, for example, an incentive offered to user 105 by a merchant, multiple merchants, payment service provider, or other entity through an electronic, paper, verbal, or other communication.

In response, payment service provider server 170 stores the incentive information received from user 105 as an incentive record in incentive database 195 (step 330). In step 340, incentive processing application 190 associates the newly stored incentive record with the particular user account 180 associated with user 105.

As the processes of FIGS. 2 and/or 3 are performed and repeated in various embodiments, a plurality of incentive records associated with the user account 180 of user 105 may be stored by payment service provider server 170. Advantageously, user 105 may use payment service provider server 170 as a repository (e.g., an electronic "wallet") to conveniently store and/or retrieve incentive information identifying various incentives which may be used in transactions with one or more different merchants and/or service providers.

Figure 4:
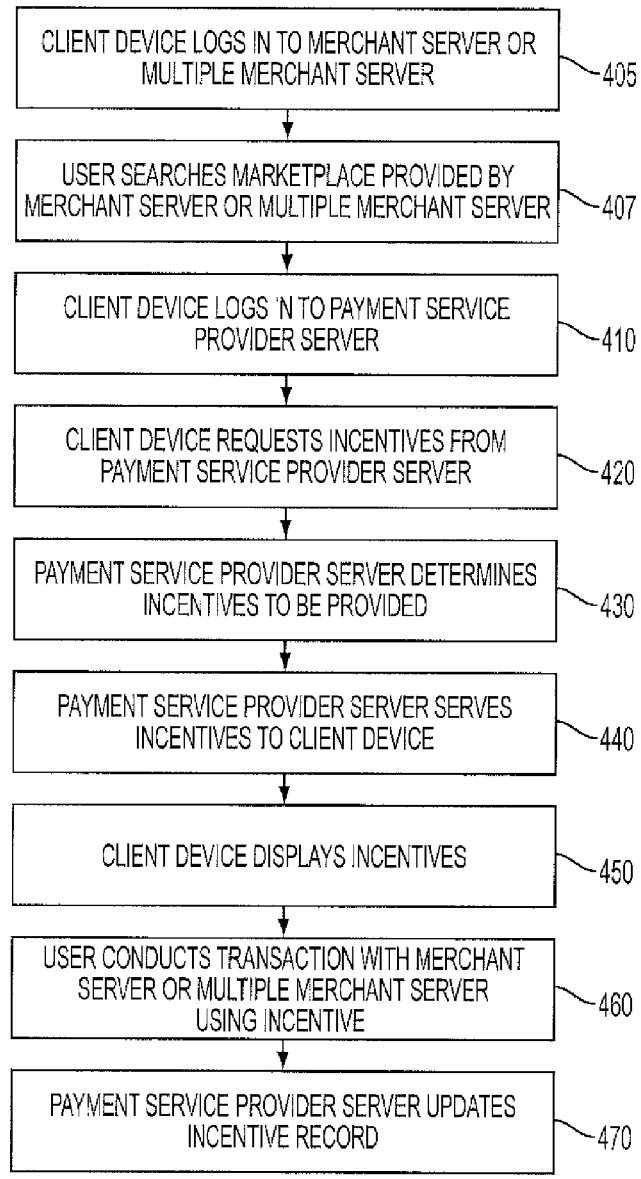
FIG. 4 illustrates a process of retrieving online incentives from a payment service provider in accordance with an embodiment of the invention.

FIG. 4 illustrates a process of retrieving online incentives from payment service provider 170 in accordance with an embodiment of the invention. In step 405, client device 110 logs in to merchant server 140 or multiple merchant server 141 through, for example, browser application 115, toolbar application 120, or other applications 125 of client device 110. In step 407, user 105 searches the marketplaces provided by merchant server 140 or multiple merchant server 141.

In step 410, client device 110 logs in to payment service provider server 170 in the manner described in step 310 of FIG. 3. In step 420, client device 110 requests that payment service provider 170 provide a list or other appropriate display of the available incentives (e.g., corresponding to incentive information stored in incentive records of incentive database 195) that are associated with the user's particular user account 180. For example, in one embodiment, step 420 corresponds to a request for all associated incentives. In another embodiment, step 420 corresponds to a search request for all incentives associated with the user's particular user account 180 that meet additional search criteria (for example, incentives associated with a particular merchant, multiple merchant marketplace, product, service, or other criteria).

Also in step 420, client device 110 may optionally pass additional criteria to payment service provider server 170. In various embodiments, such criteria may include, for example, information concerning the particular products or services viewed or selected by user 105 during step 407, the browsing habits of user 105, previous transactions by user 105, or other information as may be appropriate in particular implementations.

In step 430, incentive processing application 190 of payment service provider server 170 determines whether any incentive records of incentive database 195 match the request of step 420. In response, payment service provider server 170 serves any matching incentives (e.g., by serving the corresponding incentive information) found to client device 110 (step 440).

In step 450, client device 110 displays any incentives received from payment service provider server 170. For example, FIG. 6 illustrates a sample user interface 600 that may be displayed to user 105 on client device 110 by browser application 115 during step 450 in one embodiment. In this regard, user interface 600 may be a browser window provided by browser application 115 to display, for example, a list of incentive records 610 currently associated with the particular user account 180 and/or other criteria specified in step 420. In the particular embodiment illustrated in FIG. 6, each of incentive records 610 includes a plurality of fields identifying the particular incentive, type, original value, balance, status (e.g., expiration date or no expiration date), and validity.

FIG. 7 illustrates a sample user interface 700 that may be displayed to user 105 on client device 110 by toolbar application 120 in another embodiment. In this regard, user interface 700 may be provided by a toolbar displayed by client device 110 implemented to display, for example, a list of incentive records 710 currently associated with the particular user account 180 and/or other criteria specified in step 420. For example, in the particular embodiment illustrated in FIG. 7, each of incentive records 710 includes a plurality of fields identifying the particular incentive, type, and balance. In yet another embodiment, sample user interface 700 may correspond to a portion of an interface provided by a Microsoft Windows operating system, such as a system tray, notification area, and/or taskbar as such terms will be understood by those skilled in the art.

Referring again to FIG. 4, in step 460, user 105 may conduct a transaction with merchant server 140 and/or multiple merchant server 141 using one or more of the incentives retrieved during the process of FIG. 4. Following such a transaction wherein one or more of the incentives is used, incentive processing application 190 of payment service provider server 170 updates incentive database 195 to indicate that the one or more incentives have been used (step 470). For example, if one of the incentives used in step 460 is associated with a credit balance having a particular dollar amount, incentive database 195 may be updated to indicate a reduction in the credit balance corresponding to the cost of the transaction. In another example, if one of the incentives used in step 460 is associated with a coupon redeemable only once, then incentive database 195 may be updated to remove the incentive or indicate that the incentive is no longer available or valid for use. In various embodiments, step 470 may be performed by incentive processing application 190 of payment service provider server 170 in response to merchant server 140, multiple merchant server 141, and/or client device 110.

Figure 5:
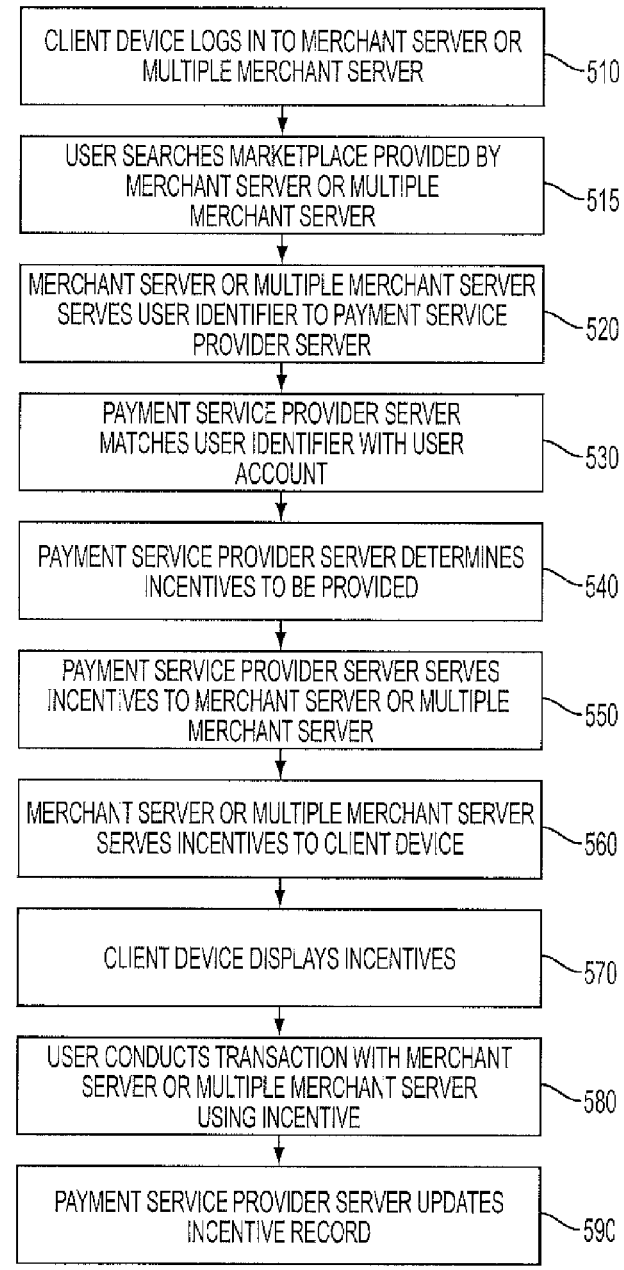
FIG. 5 illustrates a process of retrieving online incentives through a merchant server or a multiple merchant server in accordance with an embodiment of the invention.

FIG. 5 illustrates a process of retrieving online incentives through merchant server 140 or multiple merchant server 141 in accordance with an embodiment of the invention. In step 510, client device 110 logs in to merchant server 140 or multiple merchant server 141 through, for example, browser application 115, toolbar application 120, or other applications 125 of client device 110. In step 515, user 105 searches the marketplaces provided by merchant server 140 or multiple merchant server 141.

In step 520, merchant server 140 or multiple merchant server 141 detects user identifier 130 maintained by client device 110 and serves user identifier 130 to payment service provider server 170. For example, in one embodiment where user 105 interacts with marketplace applications 150/151 or checkout applications 155/156 through browser application 115, merchant server 140 or multiple merchant server 141 may be configured to detect user identifier 130 implemented by a cookie.

Also in step 520, merchant server 140 or multiple merchant server 141 may optionally pass additional criteria to payment service provider server 170. In various embodiments, such criteria may include, for example, information concerning the particular products or services viewed or selected by user 105 during step 515, the browsing habits of user 105, previous transactions by user 105, or other information as may be appropriate in particular implementations.

Upon receipt of user identifier 130 in step 530, payment service provider server 170 matches user identifier 130 with the particular user account 180 of user 105. Following this matching, incentive processing application 190 of payment service provider server 170 determines incentive information to be provided to user 105 from incentive database 195 (step 540). For example, in one embodiment, incentive processing application 190 may select incentive information from various incentive records of incentive database 195 to be provided to user 105 based on, for example, user identifier 130, the user's account information 185, the identity of merchant server 140, criteria passed in previous step 520, or other information.

In step 550, payment service provider server 170 serves any matching incentives (e.g., corresponding to incentive information stored in incentive records of incentive database 195) found to merchant server 140 or multiple merchant server 141. In response, merchant server 140 or multiple merchant server 141 serves such incentives to client device 110 (step 560).

In step 570, client device 110 displays any incentives received from merchant server 140 or multiple merchant server 141. For example, in one embodiment, browser application 115 may display a dynamically created webpage provided by merchant server 140 or multiple merchant server 141 that includes one or more embedded JavaScript tags specifying incentives provided by payment service provider server 170.

FIG. 8 illustrates a sample user interface 800 that may be displayed to user 105 on client device 110 by browser application 115 during step 570 in one embodiment when interacting with multiple merchant server 141. In this regard, user interface 800 may be a browser window provided by browser application 115 to display, for example, a list of search results 810 provided in response to step 515 as well as corresponding incentives associated with the particular user account 180 provided in step 560. For example, in the particular embodiment illustrated in FIG. 8, a corresponding merchant, price, and incentive is displayed for each search result. Advantageously, in one embodiment, sample user interface 800 allows user 105 to determine incentives available for transactions which may be performed with different merchants through multiple merchant server 141.

Following step 570, the process of FIG. 5 continues to steps 580 and 590 which may be performed in the manner described in steps 460 and 470 of FIG. 4, respectively.

In other embodiments, the various methods and systems described herein may be modified to accommodate users 105 that are not associated with an existing user account 180. For example, in such embodiments, merchant server 140 or multiple merchant server 141 may distribute incentive information to potential customers through, for example, email or advertising campaigns. In this regard, the redemption of corresponding incentives may be contingent on such potential customers registering with payment service provider server 170 and utilizing the payment services of payment service provider server 170 during a transaction with merchant server 140 or multiple merchant server 141.

In view of the present disclosure, it will be appreciated that various methods and systems have been described for providing incentive information to users of online payment service providers. Advantageously, such incentive information may be directed to particular user accounts maintained by online payment service providers to support targeted marketing efforts by merchants.

In addition, as described herein, payment service providers may permit users to view all incentives associated with their accounts, thereby providing users with a centralized, comprehensive approach to manage incentives from a plurality of online merchants. Moreover, such incentives may be viewed by users in the context of a trusted payment service provider. As a result, merchants and payment service providers can increase the likelihood of users to engage in desired online transactions.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more computer readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure.

Having thus described embodiments of the invention, persons of ordinary skill in the art will recognize that changes may be made in form and detail without departing from the scope of the invention. Thus the invention is limited only by the claims.

What is claimed is:

1. A method of managing incentives for online transactions, the method comprising:
maintaining, by a payment service provider server, a plurality of user accounts comprising user financial information of one or more particular users;
receiving, by the payment service provider server, incentive information over a network, wherein the incentive information identifies incentives created by a merchant server or a multiple merchant server and are associated with a plurality of online marketplaces to be offered to the one or more particular users;
storing, by the payment service provider server, the incentive information in a plurality of incentive records;

associating, by the payment service provider server, each of the incentive records with at least one of the user accounts in response to the received incentive information; and serving, by the payment service provider server, the incentive information of at least one of the incentive records associated with the one of the user accounts over the network, wherein the one or more particular users conduct a transaction with the merchant server or the multiple merchant server using the incentive information created by the merchant server or the multiple merchant server.

2. The method of claim 1, wherein the serving comprises serving the incentive information of the at least one of the incentive records to at least one of the online marketplaces over the network.

3. The method of claim 1, further comprising providing financial information associated with the one of the user accounts to at least one of the online marketplaces to facilitate a purchase of an item associated with the incentive information of the at least one of the incentive records.

4. The method of claim 1, further comprising receiving a user identifier over the network, wherein the user identifier is associated with one of the user accounts, wherein the serving is performed in response to the receiving the user identifier.

5. The method of claim 4, wherein the user identifier is at least one of a cookie stored by a client device or a registry entry of the client device.

6. The method of claim 1, wherein the incentive information identifies at least one of a coupon redeemable through at least one of the online marketplaces, a promotional campaign associated with the at least one of the online marketplaces, or an account balance redeemable through the at least one of the online marketplaces.

7. The method of claim 1, wherein at least one of the online marketplaces identifies items available for purchase from a plurality of merchants.

8. A non-transitory machine-readable medium comprising a plurality of machine-readable and computer executable instructions which when executed by one or more processors of a payment service provider server are adapted to cause the server to perform a method comprising:
    maintaining a plurality of user accounts comprising user financial information of one or more particular users;
    receiving incentive information over a network, wherein the incentive information identifies incentives created by a merchant server or a multiple merchant server and are associated with a plurality of online marketplaces to be offered to the one or more particular users;
    storing the incentive information in a plurality of incentive records;
    associating each of the incentive records with at least one of the user accounts in response to the received incentive information; and
    serving the incentive information of at least one of the incentive records associated with the one of the user accounts over the network, wherein the one or more particular users conduct a transaction with the merchant server or the multiple merchant server using the incentive information created by the merchant server or the multiple merchant server.

9. A method of providing incentives for online transactions, the method comprising:
    generating, by a merchant server or a multiple merchant server, incentive information identifying an incentive associated with an online marketplace;
    passing, by the merchant server or the multiple merchant server, the incentive information to a payment service provider server over a network, wherein the payment service provider server provides centralized storage and access of the incentive information generated by the merchant server or the multiple merchant server;
    providing, by the merchant server or the multiple merchant server, a client device with access to the online marketplace over the network;
    detecting, by the merchant server or the multiple merchant server, a user identifier stored by the client device;
    passing, by the merchant server or the multiple merchant server, the user identifier to the payment service provider server, wherein the payment service provider server associates the user identifier with a corresponding user account maintained at the payment service provider server;
    receiving, by the merchant server or the multiple merchant server, the incentive information from the payment service provider server in response to the user identifier associated with the corresponding user account; and
    serving, by the merchant server or the multiple merchant server, the incentive information to the client device over the network, wherein a transaction is conducted using the incentive information created by the merchant server or the multiple merchant server.

10. The method of claim 9, further comprising receiving financial information from the payment service provider to facilitate a purchase from the online marketplace using the incentive information.

11. The method of claim 9, further comprising embedding the incentive information in a webpage, wherein the serving comprises serving the webpage having the embedded incentive information to the user device.

12. The method of claim 9, wherein the serving comprises serving a webpage to the client device in response to a user-initiated request received from the client device over the network.

13. The method of claim 9, wherein the incentive infatuation identifies at least one of a coupon redeemable through the online marketplace, a promotional campaign associated with the online marketplace, or an account balance redeemable through the online marketplace.

14. The method of claim 9, wherein the user identifier is at least one of a cookie stored by the client device or a registry entry of the client device.

15. The method of claim 9, wherein the online marketplace identifies items available for purchase from a plurality of merchants.

16. A non-transitory machine-readable medium comprising a plurality of machine-readable and computer-executable instructions which when executed by one or more processors of a merchant server or a multiple merchant server are adapted to cause the server to perform a method comprising:
    generating incentive information identifying an incentive associated with an online marketplace;
    passing the incentive information to a payment service provider over a network, wherein the payment service provider provides centralized storage and access of the incentive information generated by the merchant server or the multiple merchant server;
    providing a client device with access to the online marketplace over the network;
    detecting a user identifier stored by the client device;
    passing the user identifier to the payment service provider, wherein the payment service provider associates the user identifier with a corresponding user account maintained at the payment service provider;

receiving the incentive information from the payment service provider in response to the user identifier associated with the corresponding user account; and serving the incentive information to the client device over the network, wherein a transaction is conducted using the incentive information created by the merchant server or the multiple merchant server.

17. A method of managing incentives for online transactions, the method comprising:

providing, by a client device, incentive information over a network to a payment service provider server to store the incentive information in an incentive record associated with a user account, wherein the payment service provider server provides centralized storage and access of the incentive information;

wherein the user account comprises financial information associated with a user of the client device; and wherein the incentive information identifies an incentive generated by a merchant or a multiple merchant and is associated with an online marketplace, wherein the user device is adapted to conduct a transaction using the incentive information generated by the merchant or the multiple merchant.

18. The method of claim 17, further comprising:

submitting an incentive request from the client device over the network to the payment service provider;

receiving the incentive information at the client device from the payment service provider over the network in response to the incentive request; and conducting a transaction with the online marketplace using the incentive information.

19. The method of claim 17, further comprising:

submitting a search request from the client device to the online marketplace over the network to identify an item available for purchase;

receiving the incentive information at the client device from the online marketplace over the network in response to the search request; and conducting a transaction with the online marketplace using the incentive information.

20. The method of claim 17, wherein the incentive information identifies at least one of a coupon redeemable through the online marketplace, a promotional campaign associated with the online marketplace, or an account balance redeemable through the online marketplace.

21. The method of claim 17, wherein the online marketplace identifies items available for purchase from a plurality of merchants.

22. A non-transitory machine-readable medium comprising a plurality of machine-readable and computer executable instructions which when executed by one or more processors of a client device are adapted to cause the client device to perform a method comprising:

providing incentive information from a client device over a network to a payment service provider server to store the incentive information in an incentive record associated with a user account, wherein the payment service provider server provides centralized storage and access of the incentive information;

wherein the user account comprises financial information associated with a user of the client device; and wherein the incentive information identifies an incentive generated by a merchant or a multiple merchant and is associated with an online marketplace, wherein the user device is adapted to conduct a transaction using the incentive information generated by the merchant or the multiple merchant.

23. A payment service provider system comprising:

a server in communication with a user device and a merchant server or a multiple merchant server over a network;

one or more processors; and one or more memories adapted to store a plurality of machine-readable instructions which when executed by the one or more processors are adapted to cause the system to:

maintain user financial information in a plurality of user accounts of one or more particular users;

receive incentive information over the network, wherein the incentive information identifies incentives created by the merchant server or the multiple merchant server and are associated with a plurality of online marketplaces to be offered to the one or more particular users;

store the incentive information, wherein the server provides centralized storage and access of the incentive information created by the merchant server or the multiple merchant server;

associate the incentive information with the user financial information in response to the received incentive information; and serve the incentive information over the network, wherein the one or more particular users conduct a transaction with the merchant server or the multiple merchant server using the incentive information created by the merchant server or the multiple merchant server.

24. An online marketplace system comprising:

one or more processors; and one or more memories adapted to store a plurality of machine-readable instructions which when executed by the one or more processors are adapted to cause the system, to:

generate incentive information identifying an incentive created by a merchant server or a multiple merchant server and is associated with the online marketplace;

pass the incentive information to a payment service provider over a network, wherein the payment service provider provides centralized storage and access of the incentive information;

provide a client device with access to the online marketplace over the network;

detect a user identifier stored by the client device;

pass the user identifier to the payment service provider; wherein the payment service provider associates the user identifier with a corresponding user account maintained at the payment service provider;

receive the incentive information from the payment service provider in response to the user identifier associated with the corresponding user account; and serve the incentive information to the client device over the network, wherein a transaction is conducted using the incentive information generated by the merchant server or the multiple merchant server.

25. A client device comprising:

one or more processors; and one or more memories adapted to store a plurality of machine-readable instructions which when executed by the one or more processors are adapted to cause the client device to:

provide incentive information from the client device over a network to a payment service provider server to store the incentive information in an incentive record associated with a user account, wherein the payment service provider server provides centralized storage and access of the incentive information;

wherein the user account comprises financial information associated with a user of the client device; and wherein the incentive information identifies an incentive created by a merchant server or a multiple merchant server and is associated with an online marketplace, wherein the client device is adapted to conduct a transaction using the incentive information created by the merchant server or the multiple merchant server.

* * * * *